US008328361B2

(12) United States Patent
O'Connell et al.

(10) Patent No.: US 8,328,361 B2
(45) Date of Patent: Dec. 11, 2012

(54) PROJECTION APPARATUS AND METHOD FOR PEPPER'S GHOST ILLUSION

(75) Inventors: Ian O'Connell, London (GB); James Rock, London (GB)

(73) Assignee: Musion IP Limited (GB)

( * ) Notice: Subject to any disclaimer, the term of this patent is extended or adjusted under 35 U.S.C. 154(b) by 0 days.

(21) Appl. No.: 13/011,452

(22) Filed: Jan. 21, 2011

(65) Prior Publication Data

US 2011/0157556 A1    Jun. 30, 2011

Related U.S. Application Data

(63) Continuation of application No. 10/599,553, filed on Sep. 30, 2006, now Pat. No. 7,883,212.

(30) Foreign Application Priority Data

Apr. 1, 2004   (WO) ................ PCT/GB2004/001414

(51) Int. Cl.
   *G03B 21/00* (2006.01)
   *G03B 21/56* (2006.01)
   *G02B 27/22* (2006.01)
   *A63G 31/00* (2006.01)
   *A63J 5/00* (2006.01)

(52) U.S. Cl. ............. 353/10; 359/449; 359/478; 472/63

(58) Field of Classification Search .................... 353/10, 353/74, 79, 119, 122, 28; 359/443, 447, 359/449, 478, 479, 630; 472/58, 61, 63
   See application file for complete search history.

(56) References Cited

U.S. PATENT DOCUMENTS

| 4,019,656 | A | * | 4/1977  | Spears     | 222/103 |
|-----------|---|---|---------|------------|---------|
| 4,927,238 | A | * | 5/1990  | Green et al. | 359/466 |
| 5,573,325 | A | * | 11/1996 | Lekowski   | 353/79  |
| 5,685,625 | A | * | 11/1997 | Beaver     | 353/28  |
| 5,865,519 | A | * | 2/1999  | Maass      | 353/28  |

OTHER PUBLICATIONS

Office Action in related U.S. Appl. No. 13/008,111 dated Jul. 11, 2011.
Amendment and Response filed with the United States Patent and Trademark Office on Sep. 2, 2011 in related U.S. Appl. No. 13/008,111.

* cited by examiner

*Primary Examiner* — William C Dowling
*Assistant Examiner* — Ryan Howard
(74) *Attorney, Agent, or Firm* — Thomas, Kayden, Horstemeyer & Risley LLP.

(57) ABSTRACT

An image projection apparatus includes a projector, a frame, and a partially transparent screen. The frame retains the screen under tension, such that the screen is inclined at an angle with respect to a plane of emission of light from the projector. The screen has a front surface arranged such that light emitted from the projector is reflected therefrom. The projector projects an image such that light forming the image impinges upon the screen such that a virtual image is created from light reflected from the screen, the virtual image appearing to be located behind the screen.

20 Claims, 4 Drawing Sheets

PROJECTION APPARATUS AND METHOD FOR PEPPER'S GHOST ILLUSION

This invention relates to a projection apparatus and method. More particularly, but not exclusively, it relates to a projection apparatus arranged to project an image of an object upon an inclined, partially reflective, screen so as to give a false perception of depth and a method for constructing such an apparatus.

BACKGROUND OF THE INVENTION

The projection of an image upon a partially reflective screen such that is observable by a viewer positioned in front of the screen is known, the so-called "Peppers ghost" arrangement that is known form fairground shows.

This has been applied to publicity and promotional displays where a presenter resides behind an inclined, partially reflective screen, typically a tensioned foil, onto which an image of, for example, a motor vehicle is projected, via at least one reflective surface, see for example EP 0799436. The location of the presenter behind the projected image has a number of inherent advantages over systems where the presenter stands in front of a screen, not least of which is that the presenter does not obscure the projected image when walking across the projected image. Additionally, the use of an inclined screen results in a viewer of the image perceiving the image as having depth rather than merely being a two dimensional image, for example where a motor vehicle is seen to rotate upon a turntable.

However, current image projection apparatus' do have a number of problems associated with them, for example, mounting of the foil can prove difficult which in turn leads to uneven tensioning of the foil and wrinkles upon the foil, that impair the viewed quality of the image projected onto the foil. Also, in mounting the foil the foil must be laid out upon a clean dust free piece of cloth or plastic sheet, which is larger than the foil, in order to prevent particles adhering to the foil, such particles can scratch the surface of the foil and impair the viewed quality of the projected image or act as scattering centres from which projected light is incoherently scattered, thereby detracting from the viewed quality of the image as this scattered light does not contribute to the viewed image.

Also, as the illusion of peppers ghost relies on the reflected image formed by light contrasting with its immediate surroundings and background. The stronger the reflected image, the more solid that reflected image looks, the more vibrant the colours will be, and the more visible the reflected image is to an audience. In circumstances where the presenter may be unable to control high levels of ambient light forward of the foil, e.g. from an auditorium at a trade show, the high level of ambient light results in significant levels of reflection of the ambient light from the screen detracting from the strength of the reflected image over the background. In these circumstances a bright projector (8000 lumens+) is desirable. However, the use of a bright projector results in unwanted light hitting the projection surface and reflecting through the foil to create a milky hue upon the stage and around the area where the reflected image appears.

Another problem with current image projection apparatus is that projectors used with such apparatus are very powerful, typically 8,000 to 27,000 lumens and consequently project a significant amount of light into areas of an image where there is no object within the image. This is an inherent feature of projectors and results in low contrast ratios which leads to a milky hue spread over the part of the film where the projector is creating an image when the projector is switched on. The milky hue is clearly undesirable as it detracts from the viewer's perception that there is no screen present.

The level of the milky hue relative to the brightness of the image is, at least partially, determined by the level of contrast ratio offered in the projector. The higher the contrast ratio, then the brighter the image can be relative to the brightness level of the milky hue. Even projectors with contrast rations as high as 3000:1 still emit a milky light hue when used in a "Pepper's Ghost" arrangement.

A further problem associated with some projectors is the "keystone" effect, in which distorted, typically elongated, images (up and down) occur due to angled projection. This is of particular relevance where depth perception is of importance. The solution employed in modern, expensive projectors is to employ digital correction of keystone distortions. However, older, less-expensive or even some specialist High Definition projectors do not employ such digital keystone correction and are therefore difficult to configure for use with current image projection apparatus. High definition (HD) projectors do not offer keystone adjustment because when keystone correction is attempted in conjunction with the increased number of pixels about an image's edge causes the pixels about the edge of the image to appear 'crunched'. Additionally, when processing moving images HD projectors compromise projector processing speed. When the processing power is used to carry out both keystone correction and motion processing the image is seen to jerk during movements, an effect known as "chokking". In general, it can be said that the use of electronic keystone correction to alter a video image will result in the degradation of picture quality compared to an image which is not subject to such a process.

Additionally, current systems do not allow for the projected image to apparently disappear and re-appear from behind a solid 3D object placed upon the stage, as the screen lies in front of the presenter and closest to the viewing audience.

SUMMARY OF THE INVENTION

According to a first aspect of the present invention there is provided a image projection apparatus comprising a projector, a frame, and an at least partially transparent screen:

the frame being arranged to retain the screen under tension, such that the screen is inclined at an angle with respect to a plane of emission of light from the projector;

the screen having a front surface arranged such that light emitted from the projector is reflected therefrom; and the projector being arranged to project an image such that light forming the image impinges upon the screen such that a virtual image is created from light reflected from the screen, the virtual image appearing to be located behind the screen.

Such an apparatus is advantageous over present systems in that the screen need not be coated with an expensive, partially reflective coating, an angular dependence of reflectivity of transparent dielectric materials can be used to bring about partial reflectance of the projected image. Thus, this apparatus simplifies the manufacture of such systems and also reduces their production costs. Additionally, the use of a frame frees the screen from having to be fixed directly to a ceiling, or a floor, and therefore increases the utility of apparatus over the prior art systems.

The screen may be a foil. The foil may be rolled about a cylinder when not in use. The screen may be inclined at approximately 45° to the plane of emission of light from the projector. The screen may comprise a partially reflective layer upon the front surface.

The use of a foil screen reduces the weight of the apparatus, this allows ready transportation of the apparatus between sites. Rolling the foil onto a cylinder when not in use serves to protect the foil from damage during transportation and also allows ready transportation of the apparatus between sites. The use of a partially reflective screen can increase the degree of light reflected from the screen and can increase the audience perceived strength of the virtual image.

The screen may be attached to the frame at the screen's upper and/or lower edges. The frame may comprise first and second retention members arranged to sandwich an edge region of the screen therebetween. At least one of the first and second retention members may comprise an abrasive coating, typically sandpaper, arranged to contact the screen. The first and second retention members may comprise respective openings therethrough that may be arranged to collocate with openings in respective jaws of clamping members attached to tensioning straps, the openings may be arranged to receive a fixing means so as to clamp the screen between the first and second retention members. The tensioning straps may be attached to a truss arrangement and may be adjustable such that the tension of the screen within the truss arrangement can be varied about the periphery of the screen. Preferably, the retention members are substantially parallel to truss members comprising the truss arrangement.

The use of a variable tensioning arrangement allows wrinkles upon the screen to be minimised, and ideally eradicated to present a smooth surface for upon which the image can be projected. An abrasive surface upon at least one of the retention members increases the grip between the retention member and the screen thereby reducing the likelihood of the screen slipping when held by the retention member.

The apparatus may comprise a pigmented reflective member in an optical pathway between the projector and the screen. The pigmented member may reflect only part of the visible spectrum of light, typically the pigmented member will appear grey or white to a viewer.

It has been found that the use of a grey reflective member in the optical pathway between the projector and the screen reduces the outline of the reflective member upon the screen compared to when a white reflective member is used, and also reduces the level of the milky white hue associated with the projector emitting light where there is no image of an object to be projected.

The pigmented reflective member may be inclined at an angle with respect to the plane of emission of light from the projector. The angle of inclination of the member with respect to the plane of emission of light from the projector may be variable. The member may comprise a plurality of sections each of which may have an independently variable angle of inclination with respect to the plane of emission of light from the projector.

The inclination of the reflective member can compensate, at least partially and in some instances completely, for keystone effect. The variation of the angle of inclination or distance of the reflective member allows for a variation of the apparent depth and/or position of an object when projected upon the screen. This is because the virtual image appears as far behind the screen as the real image is in front of the screen.

There may be a reflective device, typically a mirror, arranged to direct light projected from the projector on to the reflective member. Typically, the reflective device is mounted upon an upper part of the framework. The reflective member may be parallel, or substantially parallel, to the reflective device. In some embodiments the projector may be mounted upon an upper truss of the framework and may be aligned with the horizontal, typically light projected from the projector is directed on to the reflective device.

Such an arrangement compliments the keystone correction achievable by the inclination of the screen and the reflective member and is particularly useful where an HD projector is used in order to compensate for the keystone effect without the use of the projector's processing power.

The reflective member may comprise a mask corresponding to the apparent location of a prop in the screen to an audience. Typically, the mask will absorb light over at least a fraction of the visible spectrum and preferably the mask will be black. The mask may be arranged to produce an area upon the screen upon which the image is not projected. The mask may vary in extent and shape, for example by the use of a sliding element that is moved in and out of position upon the reflective member.

The mask can be used to make the illusion of an article disappearing and reappearing behind a prop that is placed upon a stage, either behind or in front of the screen.

The apparatus may comprise a light source arranged to selectively illuminate an area of stage comprising the prop. The light source may be a white light source Lighting the prop causes the prop to become more visible and better defined against the dark, typically black, background. This enhances the three dimensional effect of the projected image interacting with the prop. Also directing bright light upon the prop serves to reduce the contrast ratio of the projected image upon the prop, which typically remains slightly visible even when a mask is used in the prop's shadow upon the reflective member, thus enhancing the illusion of the projected image disappearing behind the prop.

The apparatus may comprise a light source arranged to illuminate at least part of a stage. The light source may be located to the rear of the screen, typically along a top edge of the frame and/or along either side of the stage. The apparatus may comprise a plurality of light sources. The apparatus may comprise a lighting desk equipped with faders arranged to control the level of each light source, or selection means arranged to selectively control the supply of power to each light source.

Such a light source is used in order that the colour and light levels of the area immediately surrounding the peppers ghost image, the stage background, can most closely match the colour of the projection surface background, excluding the area on both which is carrying the image. This, reduces the milky hue perceived by the audience. The use of a plurality of light sources increases the uniformity of lighting of the stage, in order to produce a similar effect to the way light emitted from a projector hits the projection screen. By controlling each light source separately the lighting levels upon the stage can be controlled to closely match the levels of light as dictated by the show performance, or the levels of unwanted light hitting the projection surface of the screen.

The projector may comprise a standard projector, for example a JVC ML4000, or a Barco G5. Alternatively, the projector may comprise an LCD, or a television display. The display may comprise at least one element arranged to be non-emitting in response to control from a processor. The at least one element may form a mask arranged to produce an area upon the screen upon which the image is not projected. The mask may correspond to the shape and location of a prop upon stage. The prop may be three dimensional.

According to a second aspect of the present invention there is provided a method of providing a projection apparatus comprising the steps of:
(i) resting a frame upon a number of elevation means;
(ii) attaching leg sections to the frame;

(iii) increasing the height of the elevation means;
(iv) adding further leg sections;
(v) attaching a lower edge of a screen to a lower rear piece of the frame;
(vi) raising an upper edge of the screen to adjacent an upper front section of the frame; and
(vii) attaching the upper edge of the screen to the upper front section of the frame.

The method may comprise providing the elevation means in the form of a jack.

The method may comprise providing the screen in the form of a film. The method may comprise removing a roll of screen film from a protective cylindrical casing. The method may comprise laying the screen upon a dust-free protective sheet.

The method may comprise placing the lower edge of the screen between jaws of a first retention member and may further comprise securing the screen in position using a fixing means passing through the retention member and the screen and a locking means arranged to lock the fixing means being arranged to secure the locking means in position. The method may comprise providing the fixing means in the form of a bolt and the locking means in the form of a nut.

The method may comprise attaching tensioning means to the retention member adjacent at least some of the fixing means.

The method may comprise attaching the tensioning means to the lower rear piece of the frame. The method may comprise attaching a second retention member to an upper edge of the film screen, typically in the same manner as the first retention member is attached to the lower edge. The method may comprise attaching tensioning means to the second retention member. The method may comprise providing the tensioning members in the form of ratchet straps.

The method may comprise attaching a rope to the second retention member and passing the rope over the upper frame and using the rope in step (vii) to raise the screen.

The method may include tensioning each of the tensioning means such that the screen is flat and substantially wrinkle free.

The method may include depending a projector from the upper frame.

The method may include placing a pigmented reflective board between the screen and a front edge of the frame. The method may comprise reflecting light emitted by the projector from the board onto the screen.

The method may comprise forming the frame from a truss work.

According to a third aspect of the present invention there is provided a projection apparatus constructed according to the second aspect of the present invention.

BRIEF DESCRIPTION OF THE SEVERAL VIEWS OF THE DRAWINGS

The invention will now be described, by way of example only, with reference to the accompanying drawings, in which.

DETAILED DESCRIPTION OF THE INVENTION

Figure 1:
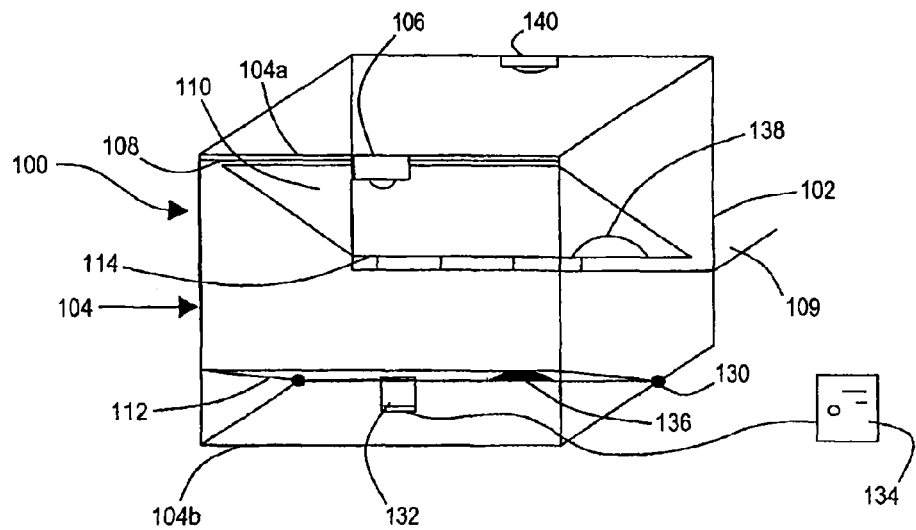
FIG. 1 is a schematic representation of a first embodiment of a projection apparatus according to at least an aspect of the present invention.
Figure 2:
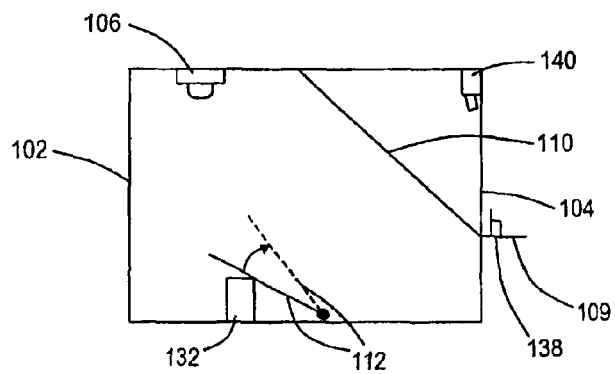
FIG. 2 is a side view of a the projection apparatus of FIG. 1 showing a pigmented reflective member in first and second positions.
Figure 4:
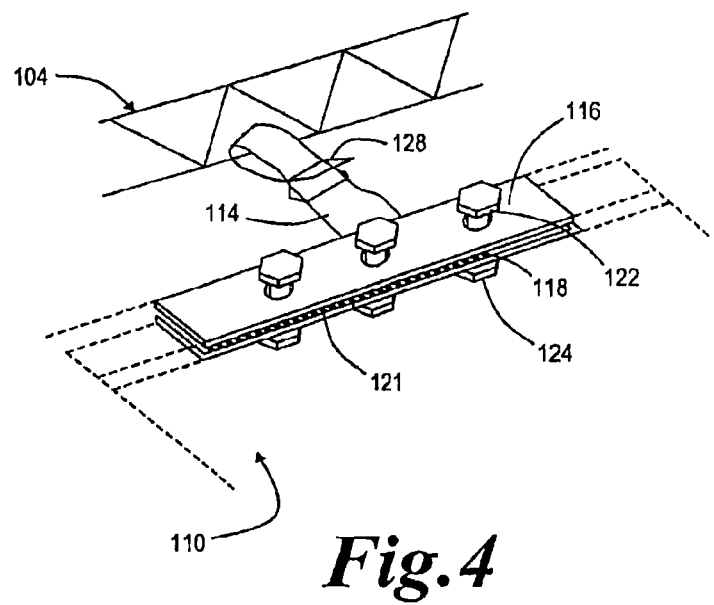
FIG. 4 is a perspective view of a screen clamping arrangement of FIGS. 1, 2 and 3.

Referring now to FIGS. 1, 2 and 4, a projection apparatus 100 comprises a box frame 102 formed of trusses 104, a projector 106, a support frame 108, a screen 110 held within the support frame 108 and a grey pigmented reflective board 112.

The projector 106 depends from a front upper cross-piece truss 104a of the box frame 102. The board 112 lies below the projector 106 at the base of the box frame 102. The screen 110, is inclined at approximately 45° to the horizontal and the front edge of the screen 110 is proximate the front upper cross-piece truss 104a of the box frame 102 and the rear edge of the screen is proximate a stage 109 that lies to the rear of the box frame 102.

The screen 110 is typically a polymeric foil, which can have a partially reflective coating upon a front face of the foil. The screen 110 is retained within the box frame 102 by means of tensioning straps 114 attached to the box frame 102, at the top and bottom edges of the screen 110. At a free end of each of the tensioning straps 114 there is pair of clamp jaws 116 which have respective openings 118,120 passing therethrough. The faces of the jaws 116 are optionally coated with an abrasive 121, such as sandpaper, in order to enhance the grip of the jaws 116 upon the screen 110.

Edges of the screen 110 are placed between the jaws 116 and a bolt 122 is placed through the openings 118, 120 and passes through the screen 110. A nut 124 is threaded onto the bolt 122 and tightened to hold the screen 110 between the jaws 116. The tensioning straps 114 pass through the trusses 104 and are tightened using a friction locking buckle arrangement 128.

Each of the tensioning straps 114 can be tightened or loosened individually so as to allow an even tension to be applied over the whole surface of the screen 110 thereby reducing, and ideally eliminating, the formation of wrinkles upon the screen 110 which reduce the quality of an image projected upon the screen 110.

The reflective board 112 lies below the projector 106 adjacent to a lower front cross-piece truss 104b of the box frame 102. The projector 106 is directed such that light emitted by the projector 106 strikes the reflective board 112. The board 112 is inclined so that the light emitted by the projector 106 is reflected upwards from the board 112 onto the screen 110. The use of a grey, or otherwise coloured board 112 reduces the milky hue associated with light from the projector where there is no image to be projected.

A fraction of the projected light striking the screen 110 is reflected from the front surface of the screen 110 where is can be viewed by an audience. A presenter upon the stage 109 behind the screen 110 can also be viewed by the audience but does not interfere with the viewing of the image by the audience.

The board 112 is connected to a hinge arrangement 130 along a rear edge thereof. The hinge arrangement 130 allows the board 112 to be raised and lowered, typically be a hydraulic ramp 132 controlled by a computer 134, in order to compensate for the 'keystone' effect. Alternatively, the board 112 can be raised and lowered by the person pulling upon a string, or an electric motor to drive the board up and down.

The raising and lowering of the board 112 also allows for the audience's perception of the positional depth upon the stage of an element of a projected image to be altered by varying the height of the element of the image upon the screen 110. It is envisaged that the board 112 may comprise a number of individual sections each of which may be raised an lowered individually in order to allow the perceived depth of an individual element of an image to be varied independently of other elements of the image.

A non-reflective mask 136 in the shape of a prop 138, in this example a rock, is placed upon the board 112. The prop 138 is place upon the stage 109, typically behind the screen 110. The mask 136 is placed such that the board 112 is obscured in a region corresponding to where the prop 138 is located with respect to the screen 110. This arrangement of mask 136 and prop 138 results in an image, or part of the image, projected upon the screen 110 apparently disappearing as the image, or part of the image, passes over prop 138 and reappearing once the image, or part, of the image has passed over the prop 138 as the mask 136 prevents light being reflected onto the region of the screen 110 corresponding to the location of the prop 138. The mask 136 can be variable in size and shape, for example by means of a sliding panel that is moved into location and varied in size according to the size of the prop 138. This also allows for the depth perception of props to be varied as their apparent effect upon variable depth image elements, as discussed hereinbefore, can be varied appropriately, for example a given size of rock will obscure proportionately more of a distant image than the same rock will of a near image.

A light source 140 is mounted upon the box frame 102 and illuminates the prop 138 in order to reduce the effect of any residual light reflected from the board 112 onto the prop.

Figure 2A:
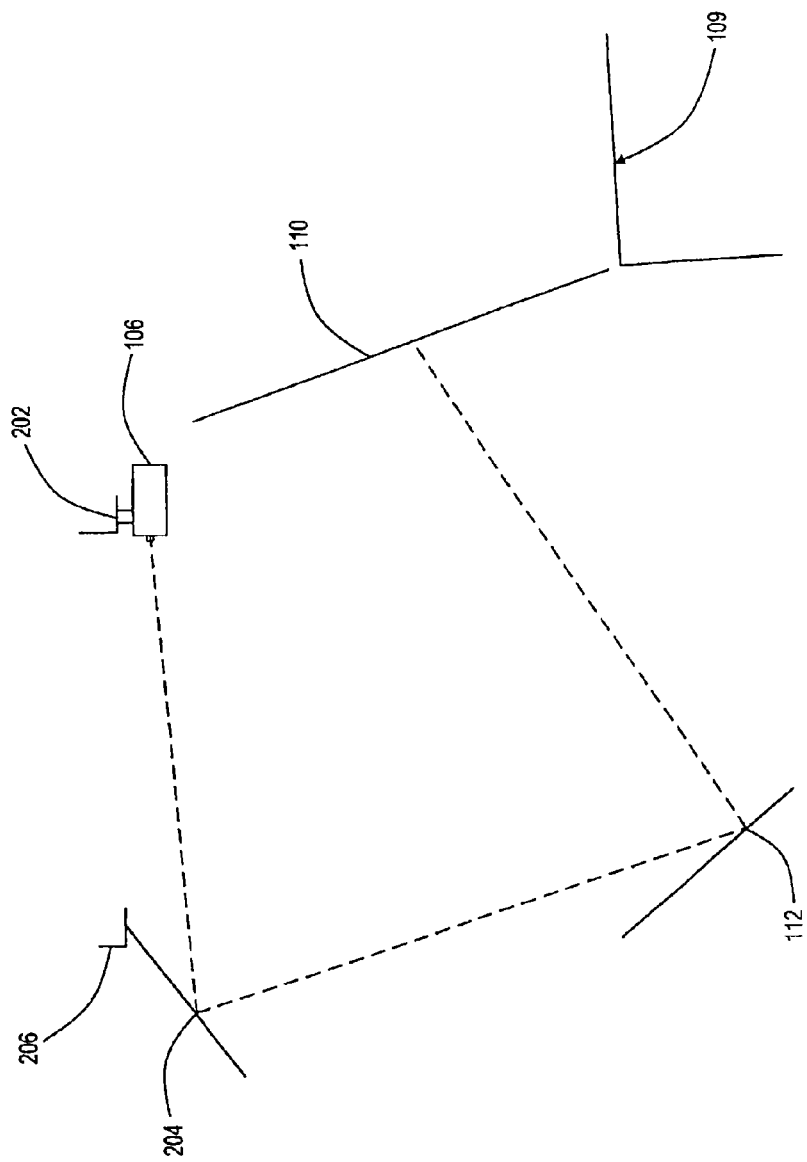
FIG. 2a is a schematic representation of an alternative projection arrangement, suitable for use with the apparatus of FIGS. 1 and 2.

Referring now to FIG. 2a, an alternative projection arrangement 200, suitable for use with the apparatus of FIGS. 1 and 2 with an additional truss, comprises the projector 106 depending from a truss 202 forward of the screen 110, an inclined mirror 204 of variable inclination depending from a second truss 206 forward of projector 110. The projector 106 projects an image on to the mirror 204 such that the image is projected on to the reflective board 112 and on to the screen 110. The mirror 204 is typically arranged to be perpendicular to the board 112, and in embodiments where the board 112 has a variable angle of inclination the mirror 204 will usually be arranged to track, synchronously, with any variation in the angle of inclination of the board 112.

It will be appreciated that the term mirror is used herein to describe any reflective surface that reflects substantially all, typically in excess of 50% preferably in excess of 80%, light impinging upon it.

Figure 3:
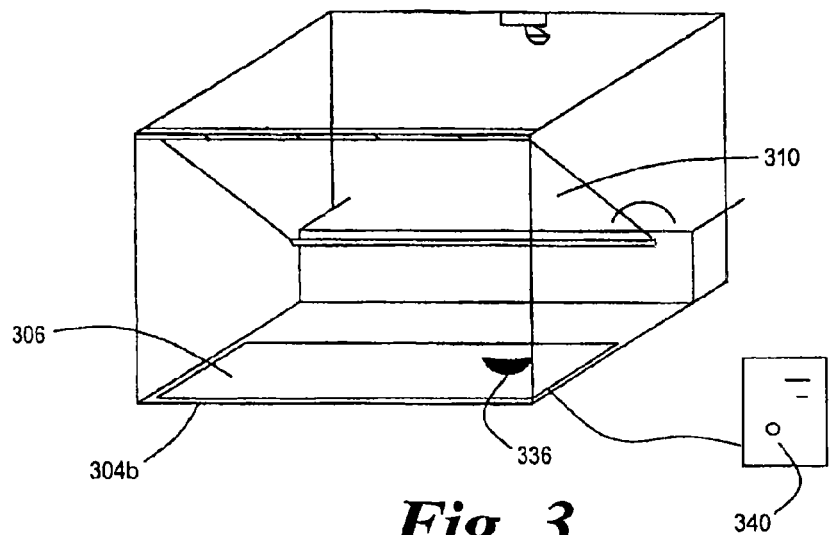
FIG. 3 is a schematic representation of a second embodiment of a projection apparatus according to at least an aspect of the present invention.

Referring now to FIG. 3, a projection apparatus 300 is substantially similar to that of FIGS. 1 and 2 accordingly identical parts to those of FIGS. 1 and 2 are accorded similar reference numerals in the three hundred series.

A projection screen 306 resides in front of the screen 310 adjacent the lower front cross-piece truss 304b. The projection screen 306 is typically a liquid crystal display (LCD) screen or a television screen. The projection screen 306 projects an image upwards onto the front surface of the screen 310. The use of a projection screen 306 removes the 'keystone' effect associated with conventional projectors.

A mask 336 can be formed upon the screen by use of a computer 340 to control the projection screen 306 to black out the appropriate part of the projection screen 306 electronically. This removes the need for a physical mask to be produced. The computer 340 can be used to switch of areas of the projection screen 306 which do not contain part of an image to be projected, this reduces the milky white hue associated with such areas when using conventional projectors. Also, the use of a computer 340 to control the projection screen 306, together with image sizing in relation to image movement allows an image to be readily scaled and positioned upon the projection screen 306 to enhance an audience's perception of depth and movement of a projected image using known image processing techniques. Alternatively, the projection screen 306, or sections of the projection screen 306, can be raised and lowered under the control of the computer 340 in order to enhance the audience's perception of depth of the projected image.

Figure 5:
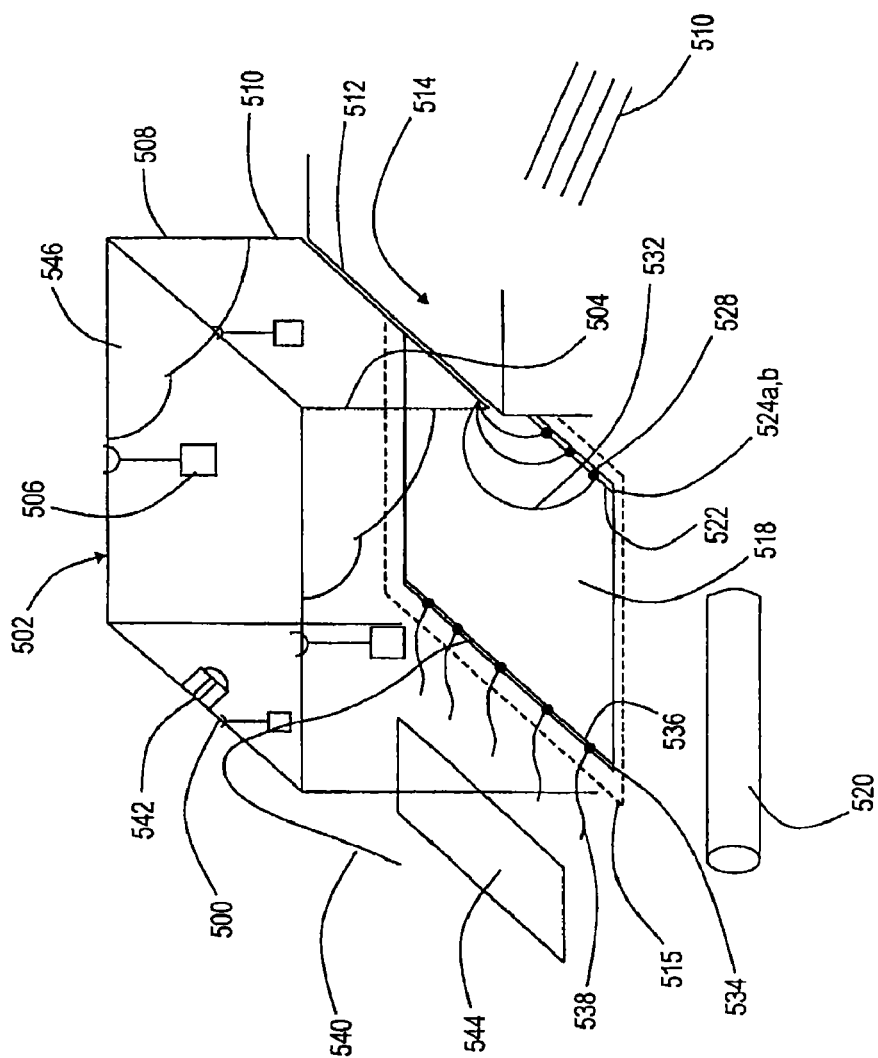
FIG. 5 is a schematic view of a projection apparatus being constructed according to the second aspect of the present invention.

Referring now to FIG. 5, a box truss framework 500 comprises a square upper truss work 502 and leg trusses 504. In constructing the framework 500 the upper truss work 502 rests upon a number of jacks 506. First sections 508 of the leg trusses 504 that extend at right angles to the upper truss work 502 are added at the corners of the upper truss work 502. The height of the jacks 506 is increased to allow additional sections 510 of the leg trusses 504 to be added until the desired height of the box truss framework 500 is achieved.

A cross-piece truss 512 is fixed to two of the leg trusses 504 such that it horizontally spans the gap therebetween at a height close to, and typically slightly below, the level of a stage floor 514. The leg trusses 504 spanned by the cross-piece truss 512 constitute the rear legs of the framework 500 and are located adjacent the front of the stage floor 514.

A dust-free protective plastic sheet 515 is laid across the width of the stage floor 514 in front of the rear legs of the framework 500. A roll of screen film 518 is removed from a protective cylindrical casing 520 and is unwound across the width of the stage floor 514. The film 518 is placed upon the sheet 515 in order to prevent damage to the surface from dust particles or other sharp protrusions.

A lower edge 522 of the film 518 is placed between jaws 524a,b of a retention member 526, each jaw 524a,b having opposed openings therethrough spaced at approximately 0.5 m intervals. Bolts 528 are placed through the openings, and through the film 518, and secured in position using respective nuts. Ratchet straps 532 are attached to the retention member 526 adjacent alternate bolts 528, having a spacing of approximately 1m, and are then attached to the cross-piece truss 512.

A second retention member 534 is attached to an upper edge 536 of the film 518 in a similar manner to how the retention member 526 is attached to the lower edge 522. Ratchet straps 538 are attached to the second retention member 534.

A rope 540 is tied to the second retention member 534 and is passed over the upper truss work 502 opposite the cross-piece truss 512. The film raised into position using the rope 540 and the ratchet straps 538 are attached to the upper truss work 502. Both sets of ratchet straps 532, 538 are tightened individually until the screen film is tensioned such that the film 518 is flat and, ideally, free from wrinkles.

A projector 542 is depended from the upper truss work 502 and a pigmented reflective board 544 is placed between the screen 518 and the front edge of the box truss framework 500 such that light emitted by the projector 542 is reflected from the board 544 onto the screen 518. The screen 518 reflects at least part of the light from a front surface thereof away from the stage and into an auditorium to be viewed by and audience.

In order to prevent the audience observing the projection apparatus both side and front drapes 546 are used to screen the apparatus from the audience.

The invention claimed is:

1. An image display apparatus, comprising:
an image source, a frame, a light source and an at least partially transparent screen;
the frame being arranged to retain the screen under tension, such that the tension of the screen can be independently varied at a plurality of positions along at least one edge of said screen;
the light source arranged to illuminate at least part of the apparatus;
the screen inclined at an angle with respect to a plane of emission of light from the image source and the screen having a front surface arranged such that light emitted from the image source is reflected therefrom; and
the image source being arranged such that light forming the image impinges upon the screen such that a virtual image is created from light reflected from the screen, the virtual image appearing to be located behind the screen,
wherein the screen is polymeric foil and the frame comprises first and second retention members having opposing faces arranged in parallel to sandwich an edge region of the screen therebetween, and at least one of the faces of the first and second retention members comprises an abrasive coating arranged to contact the screen, and
wherein the first and second retention members are connected to one or more flexible tensioning means, which extend from the frame, the flexible tensioning means comprising tensioning straps and corresponding friction locking buckle arrangements for tightening the tensioning straps;
the foil, flexible tensioning means and the frame lying in a common inclined plane, with the faces of the first and second retention members being oriented parallel to the common inclined plane and the tension on the foil being applied in the common inclined plane.

2. The apparatus according to claim 1 wherein the abrasive coating is sandpaper.

3. The apparatus according to claim 1 wherein the first and second retention members comprise respective openings therethrough arranged to collocate with respective openings in the screen wherein the openings are arranged to receive a fixing means so as to clamp the screen between the first and second retention members.

4. The apparatus according to claim 1 wherein the frame is arranged to retain the screen under tension such that the tension of the screen can be varied at a plurality of positions along at least one edge of the screen such that the screen is substantially wrinkle free.

5. The apparatus according to claim 1 further comprising a pigmented reflective member provided in an optical pathway between the image source and the screen and being operative to reflect only light from part of the visible spectrum.

6. The apparatus according to claim 5 wherein the pigmented reflective member appears grey to a viewer.

7. The apparatus according to claim 1 further comprising a second light source arranged to illuminate at least part of a stage lying behind the screen.

8. The apparatus of claim 1, wherein both of the faces of the first and second retention members comprise an abrasive coating.

9. The apparatus according to claim 1 wherein the image source comprises one of a projector, an LCD, or a television display.

10. An image display apparatus, comprising:
an image source, a frame, tensioning straps and corresponding friction locking buckle arrangements for tightening the tensioning straps, a light source and an at least partially transparent screen;
the frame being arranged to retain the screen under tension, such that the tension of the screen can be independently varied at a plurality of positions along at least one edge of said screen;
the light source arranged to illuminate at least part of the apparatus;
the screen inclined at an angle with respect to a plane of emission of light from the image source and the screen having a front surface arranged such that light emitted from the image source is reflected therefrom; and
the image source being arranged such that light forming the image impinges upon the screen such that a virtual image is created from light reflected from the screen, the virtual image appearing to be located behind the screen,
wherein the screen is polymeric foil and the frame comprises first and second retention members having opposing faces arranged in parallel to sandwich an edge region of the screen therebetween, and at least one of the faces of the first and second retention members comprises an abrasive coating arranged to contact the screen, and
wherein the foil and the frame reside in a common inclined plane, with the faces of the first and second retention members being oriented parallel to the common inclined plane, the retention members being under tension, with the tension on the retention members and the foil being applied by the tensioning straps in the common inclined plane.

11. The apparatus of claim 10, wherein the first and second retention members are connected to one or more tensioning means, which extend from the frame.

12. The apparatus of claim 11, wherein the tensioning means are flexible tensioning means.

13. The apparatus according to claim 10, wherein the abrasive coating is sandpaper.

14. The apparatus according to claim 10, wherein the first and second retention members comprise respective openings therethrough arranged to collocate with respective openings in the screen wherein the openings are arranged to receive a fixing means so as to clamp the screen between the first and second retention members.

15. The apparatus according to claim 10, wherein the frame is arranged to retain the screen under tension such that the tension of the screen can be varied at a plurality of positions along at least one edge of the screen such that the screen is substantially wrinkle free.

16. The apparatus according to claim 10, further comprising a pigmented reflective member provided in an optical pathway between the image source and the screen and being operative to reflect only light from part of the visible spectrum.

17. The apparatus according to claim 16, wherein the pigmented reflective member appears grey to a viewer.

18. The apparatus according to claim 10, wherein the image source comprises one of a projector, an LCD, or a television display.

19. The apparatus according to claim 10, further comprising a second light source arranged to illuminate at least part of a stage lying behind the screen.

20. The apparatus of claim 10, wherein both of the faces of the first and second retention members comprise an abrasive coating.

* * * * *